(12) United States Patent
Gonzalez et al.

(10) Patent No.: US 10,757,271 B2
(45) Date of Patent: Aug. 25, 2020

(54) MESH NETWORK ADAPTER, METHOD FOR TRANSMITTING IMAGE DATA FROM A CAMERA TO A REMOTE COMPUTER

(71) Applicants: Gregory Herbert Gonzalez, Charlotte, NC (US); Mark Earl Randall, Mount Vernon, IN (US)

(72) Inventors: Gregory Herbert Gonzalez, Charlotte, NC (US); Mark Earl Randall, Mount Vernon, IN (US)

( * ) Notice: Subject to any disclaimer, the term of this patent is extended or adjusted under 35 U.S.C. 154(b) by 55 days.

(21) Appl. No.: 16/096,109

(22) PCT Filed: Apr. 26, 2017

(86) PCT No.: PCT/US2017/029698
§ 371 (c)(1),
(2) Date: Oct. 24, 2018

(87) PCT Pub. No.: WO2017/189763
PCT Pub. Date: Nov. 2, 2017

(65) Prior Publication Data
US 2019/0158686 A1 May 23, 2019

Related U.S. Application Data

(60) Provisional application No. 62/327,691, filed on Apr. 26, 2016.

(51) Int. Cl.
*H04N 1/00* (2006.01)
*H04N 1/21* (2006.01)
(Continued)

(52) U.S. Cl.
CPC ......... *H04N 1/00108* (2013.01); *G06F 3/061* (2013.01); *G06F 3/0655* (2013.01);
(Continued)

(58) Field of Classification Search
CPC .. H04N 1/00; H04N 1/00108; H04N 1/00137; H04N 1/2112; H04L 67/10; H04L 67/12
See application file for complete search history.

(56) References Cited

U.S. PATENT DOCUMENTS

2010/0145146 A1\* 6/2010 Melder .............. A61B 1/00052
600/112
2011/0059628 A1 3/2011 Chen
(Continued)

OTHER PUBLICATIONS

Ninia, "SIM Card Flexible Extender, SD Card Flexible Extender Selection Guide," Jin Shan Electric Co, Taiwan, 2014 https://www.ninia413.com/uploadfiles/90/Products/PCB-Adapter-Card/SD/B1908B-DB19/simsd_selection-guide_460361.pdf.
(Continued)

*Primary Examiner* — Ngoc Yen T Vu
(74) *Attorney, Agent, or Firm* — Schwartz Law Firm, P.C.

(57) ABSTRACT

A mesh network adapter is designed to communicate with a camera, and is configured to form a mesh node in a wireless mesh network. The network adapter includes housing, a microprocessor, a transceiver, a non-volatile onboard data storage medium, and an elongate flexible extension cable. The flexible cable is operatively connected to the microprocessor at the camera end, and interfaces with the onboard data storage medium and a removable memory card. The microprocessor functions to control the transfer of image data from the camera through the flexible cable to the removable memory card, and from the removable memory card to the onboard data storage medium for subsequent wireless transmission to a gateway within the mesh network.

19 Claims, 7 Drawing Sheets

(51) Int. Cl.
*H04L 29/08* (2006.01)
*G06F 3/06* (2006.01)
*H04N 5/232* (2006.01)
*H04W 84/18* (2009.01)
*H04W 88/16* (2009.01)

(52) U.S. Cl.
CPC ............ *G06F 3/0679* (2013.01); *H04L 67/10* (2013.01); *H04L 67/12* (2013.01); *H04N 1/00* (2013.01); *H04N 1/00137* (2013.01); *H04N 1/2112* (2013.01); *H04N 5/23203* (2013.01); *H04N 2201/0084* (2013.01); *H04W 84/18* (2013.01); *H04W 88/16* (2013.01)

(56) References Cited

U.S. PATENT DOCUMENTS

| | | |
|---|---|---|
| 2011/0210816 A1 | 9/2011 | Wang |
| 2013/0120591 A1 | 5/2013 | Bednarczyk et al. |
| 2014/0196025 A1* | 7/2014 | Corinella ................ H04W 4/21 |
| | | 717/178 |

OTHER PUBLICATIONS

Olympus, "Digital Camera TG-850 Instruction Manual," Olympus Imaging America, Inc., WC374401 http://www.olympusamerica.com/files/oima_cckb/TG-850_MANUAL_ENGLISH.PDF.
PCT/US17/29698, Apr. 26, 2016.

* cited by examiner

FIG. 7

MESH NETWORK ADAPTER, METHOD FOR TRANSMITTING IMAGE DATA FROM A CAMERA TO A REMOTE COMPUTER

TECHNICAL FIELD AND BACKGROUND OF THE DISCLOSURE

The present disclosure relates broadly and generally to a mesh network adapter applicable for use in a wireless mesh network, and a method for transmitting image data from a camera to a remote computer. For digital cameras, all images are recorded onto a memory card, such as a commonly available SD card. In one embodiment of the disclosure, images stored on the memory card may be transmitted from the camera via a wireless mesh network to a gateway device, and ultimately routed to the remote computer.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a mesh network adapter designed to communicate with a camera, and configured to form a mesh node in a wireless mesh network. The network adapter comprises a sealed or "weather-proof" housing, a microprocessor (or microcontroller), a transceiver or other signal transmitter, a non-volatile onboard data storage medium, and an elongate flexible extension cable having an adapter end and camera end. The transceiver and onboard data storage medium are operatively connected to the microprocessor inside the housing. A removable memory card is configured to insert into a complementary card slot formed with (or inside) the housing. The flexible cable is operatively connected to the microprocessor at the adapter end, and interfaces with the onboard data storage medium and the removable memory card. A rigid male connector is formed with the camera end of the flexible cable, and has a plurality of exposed metal contacts adapted to mate with complementary contacts in a memory card slot of the camera. The microprocessor functions to (intelligently) control the transfer of image data from the camera through the extension cable to the removable memory card, and from the removable memory card to the onboard data storage medium for subsequent wireless transmission to a gateway within the mesh network.

The terms "operatively connected", "operatively interconnected", and "operatively connecting" are defined broadly herein to mean a direct physical (wired) connection, an indirect physical connection (e.g., through one or multiple intermediary components), a wireless communication/connection, or a direct or indirect interfacing of components.

As used herein, the term "camera" refers to any camera (e.g., digital camera) which utilizes a flash storage medium, such as a removable memory card.

The term "remote computer" refers broadly and generally to any general or specific purpose computer capable of receiving or uploading image data for viewing, and physically located outside of the network adapter and its cable-connected camera. For example, the remote computer may comprise a mobile computing device, such as a laptop computer, netbook, e-reader, tablet computer, mobile phone, smartphone, personal digital assistant, desktop, and others.

According to another exemplary embodiment, the extension cable comprises a flat flexible cable (FFC)—or ribbon connector—having a plurality insulated electrical traces.

According to another exemplary embodiment, the memory card comprises a footprint configuration selected from a group consisting of standard size, mini size, and micro size. As used herein, the terms "standard size", "mini size" and "micro size" are defined as follows:

Standard Size: substantially 32.0×4.0×2.1 mm (1.260× 0.945×0.083 in)

Mini Size: substantially 21.5×20.0×1.4 mm (0.846× 0.787×0.055 in)

Micro Size: substantially 15.0×11.0×1.0 mm (0.591× 0.433×0.039 in)

According to another exemplary embodiment, the onboard data storage medium comprises a second removable memory card adapted for inserting into a second complementary card slot formed with the housing. The term "formed with the housing" is broadly defined to mean that the card slot may be formed by structure of the housing body, or any internal or external component of the housing or housing body, and may be accessed by a user from either outside the housing or inside the housing.

According to another exemplary embodiment, the adapter end of the flexible cable is removably operatively connected to the microprocessor.

According to another exemplary embodiment, the adapter end of the flexible cable comprises a rigid male connector having a plurality of exposed metal contacts adapted to mate with complementary contacts operatively connecting the extension cable to the microprocessor.

According to another exemplary embodiment, the male connector at the camera end of the flexible cable has a footprint configuration substantially corresponding to a memory card footprint configuration selected from a group consisting of standard size, mini size, and micro size (as defined above).

According to another exemplary embodiment, the removable memory card has a storage capacity of up to 2 TB.

According to another exemplary embodiment, the removable memory card has a bus speed of up to 624 MByte/s.

According to another exemplary embodiment, the memory card comprises a Secure Digital flash memory format. Other exemplary flash memory formats include Memory Stick, MultiMedia Card (MMC), x-D Picture Card, CompactFlash (CF), and USB flash drives.

In yet another exemplary embodiment, the disclosure comprises a method for transmitting image data from a camera to a remote computer. The method includes forming a wireless mesh network comprising a plurality mesh network adapters. At least one of the mesh network adapters comprising a housing, a microprocessor located inside the housing, a transmitter located inside the housing and operatively connected to the microprocessor, and an elongated flexible extension cable operatively interconnecting the microprocessor and the camera. Image data captured by the camera is transferred through the extension cable to the mesh network adapter. The image data is then staged for subsequent wireless transmission from the mesh network adapter to a gateway within the mesh network. Using the gateway, the image data is wirelessly transmitted to the remote computer.

As generally known and understood in the art, a wireless mesh network relies on radio signals in order to wirelessly transfer information from one device (or "node") to another. However, while traditional wireless networks connect a computer to a wireless router or access point, devices in a wireless mesh network communicate with each other directly and are not dependent on Internet access. The devices in the mesh network act as routers to transmit data (using dynamic routing algorithms) from nearby devices to peers that are too far away to reach in a single hop, resulting in a network that can span larger distances. The routing algorithm used may attempt to ensure that the data takes the most efficient route to its destination. Wireless mesh networks are also reliable and offer redundancy. When one device can no longer operate, the rest of the device can still communicate with each other, directly or through one or more intermediate nodes, Wireless mesh networks can self form and self heal. Wireless mesh networks can be implemented with various wireless technologies including 802.11, 802.15, 802.16, cellular technologies and need not be restricted to any one technology or protocol.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
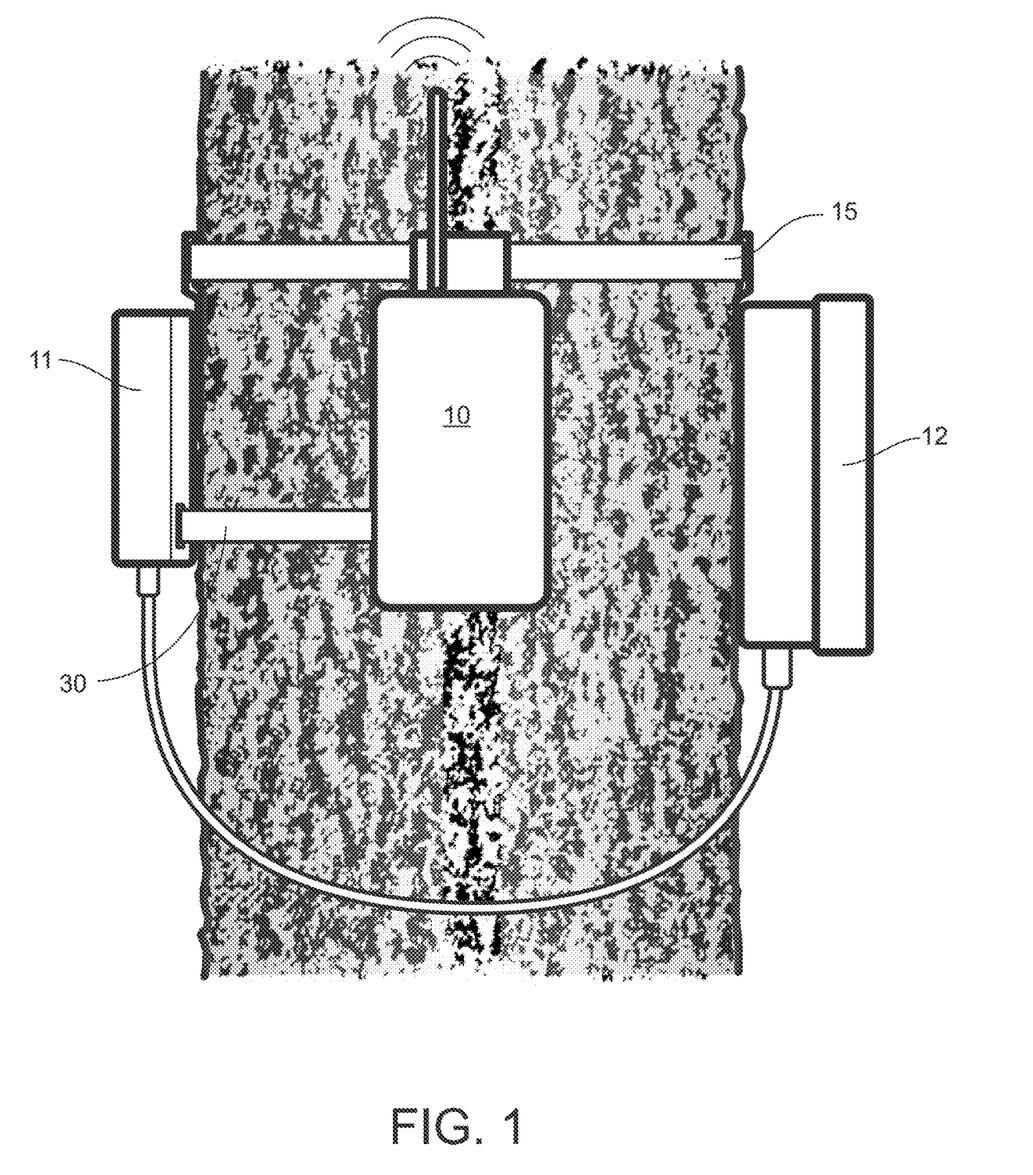
FIG. 1 is an environmental view showing the exemplary camera mesh network adapter (CMNA) hung from a tree adjacent a camera and battery pack.

Referring now specifically to the drawings, a wireless camera mesh network adapter (hereinafter "CMNA", or simply "adapter") according to one exemplary embodiment of the present disclosure is illustrated in FIG. 1, and shown generally at broad reference numeral 10. The exemplary CMNA 10 operatively connects to a digital trail camera 11 (or other remote camera), and is configured to automatically transmit image data captured by the trail camera 11 in a wireless mesh network as described further below. The trail camera 11 may comprise any conventional digital game or outdoor camera which utilizes a removable non-volatile electronic data storage medium, such as a flash memory card. One exemplary camera comprises the Moultrie S-50i Game Camera sold by Moultrie Feeders of Calera, Ala., and capable of capturing 20-megapixel images and 1080p HD video. The trail camera 11 may connect directly to a battery pack 12, and may be hung together with the battery pack 12 and CMNA 10 from a tree using a suitable mount strap 15.

Figure 2:
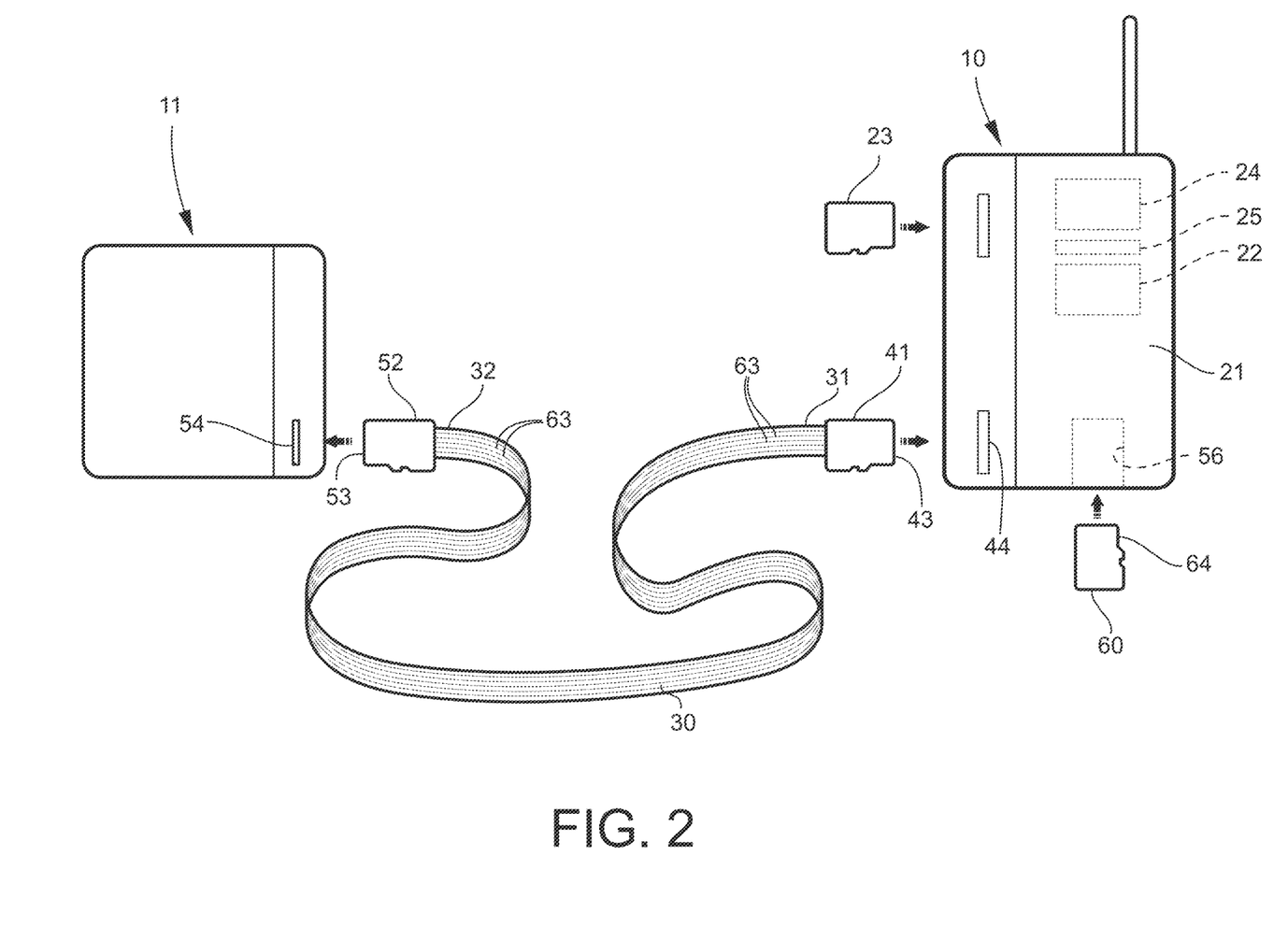
FIG. 2 is view demonstrating operative interconnection of the CMNA and camera using an exemplary flexible cable.

Referring to FIG. 2, the exemplary CMNA 10 has a rugged, weather-proof housing 21 containing a programmable microprocessor 22 mounted on a printed circuit board (PCB), non-volatile flash memory 23, a wireless transceiver 24 (or other signal transmitter or transmitter-receiver), and a rechargeable or replaceable battery 25. The microprocessor 22, flash memory 23, and transceiver 24 are operatively interconnected, and receive electrical power as needed from the adapter battery 25 (or battery pack 12) or other integrated power supply. The flash memory 23 may comprise a removable memory card or other portable data storage device, or may be integrated with the PCB. In one exemplary embodiment, the wireless transceiver 24 comprises a 900 MHz frequency-hopping, spread spectrum transceiver module adapted to readily communicate image data within the wireless mesh network. The exemplary transceiver 24 has transmission power output of 140 mW, and is capable of operating at long ranges—up to one-quarter mile in urban environments and up to 20 miles in line-of-sight conditions.

The present CMNA 10 and trail camera 11 are operatively connected together using an electrical flat flexible cable (FFC) 30 with an exemplary length of between 18 and 24 inches. The flexible cable 30 has an adapter end 31 configured to extend inside the housing 21 to the PCB—directly interfacing with the microprocessor 22, and an opposite camera end 32 extending outside the housing 21 and having sufficient length to reach the trail camera 11. The adapter end 31 of the flexible cable 30 may be permanently secured to the housing 21 and PCB; or alternatively, may be releasably operatively connected using a rigid male connector 41 having a number of exposed metal contacts 43 designed to engage complementary contacts (not shown) in a slot 44 formed with the housing 21. Similarly, a second rigid male connector 52 is formed with the camera end 32 of the flexible cable 30, and has exposed metal contacts 53 designed to mate with complementary contacts (not shown) in a memory card slot 54 of the camera 11. The camera end 32 of the exemplary cable 30 is sufficiently flat and thin to avoid interfering with or compromising the existing weather-proof seal of a camera access door to the card slot 54.

Before connecting the CMNA 10 to the trail camera 11, the existing flash memory card 60 is removed from the camera's integrated memory card slot 54, and inserted into a complementary card slot 56 formed with (or inside) the CMNA housing 21. The exemplary memory card 60 may comprise a Secure Digital (SD) flash memory format, or may comprise other formats including Memory Stick, MultiMedia Card (MMC), x-D Picture Card, CompactFlash (CF), and USB flash drives. The card may have a storage capacity of up to 2 terabytes (TB) and a bus speed of up to 624 megabytes (MB) per second.

In one exemplary embodiment the removable memory card 60 has one of three conventional footprint configurations—standard size, mini size, and micro size, as indicated below.

Standard Size: substantially 32.0×4.0×2.1 mm (1.260×0.945×0.083 in)

Mini Size: substantially 21.5×20.0×1.4 mm (0.846×0.787×0.055 in)

Micro Size: substantially 15.0×11.0×1.0 mm (0.591×0.433×0.039 in)

Likewise, the rigid male connector 52 at the camera end 32 of flexible cable 30 may have a footprint configuration identical to that of the memory card 60, or substantially corresponding one of the other sizes indicated above. In the exemplary cable 30, both male connectors 41, 52 at respective ends 31, 32 of the flexible cable 30 have an equal number of metal contact pads 43, 53 with a corresponding number of insulated electrical traces 63 extending therebetween. The electrical traces 63 may be laminated within an insulator, such as polyester. The number of contact pads 43, 53 and traces 63 in the flexible cable 30 may also correspond to the number of contacts 64 on the removable memory card 60.

As discussed further below, the CMNA microprocessor 22 functions to (intelligently) control the transfer of image data from the camera 11 through the extension cable 30 to the removable memory card 60 in CMNA 10, and from the removable memory card 60 to the onboard data storage medium (e.g., card 23) for subsequent wireless transmission to a gateway within the mesh network. Memory cards 23 and 60 may have identical footprint configurations and specifications.

Exemplary Operation of the Present CMNA

Figure 3:
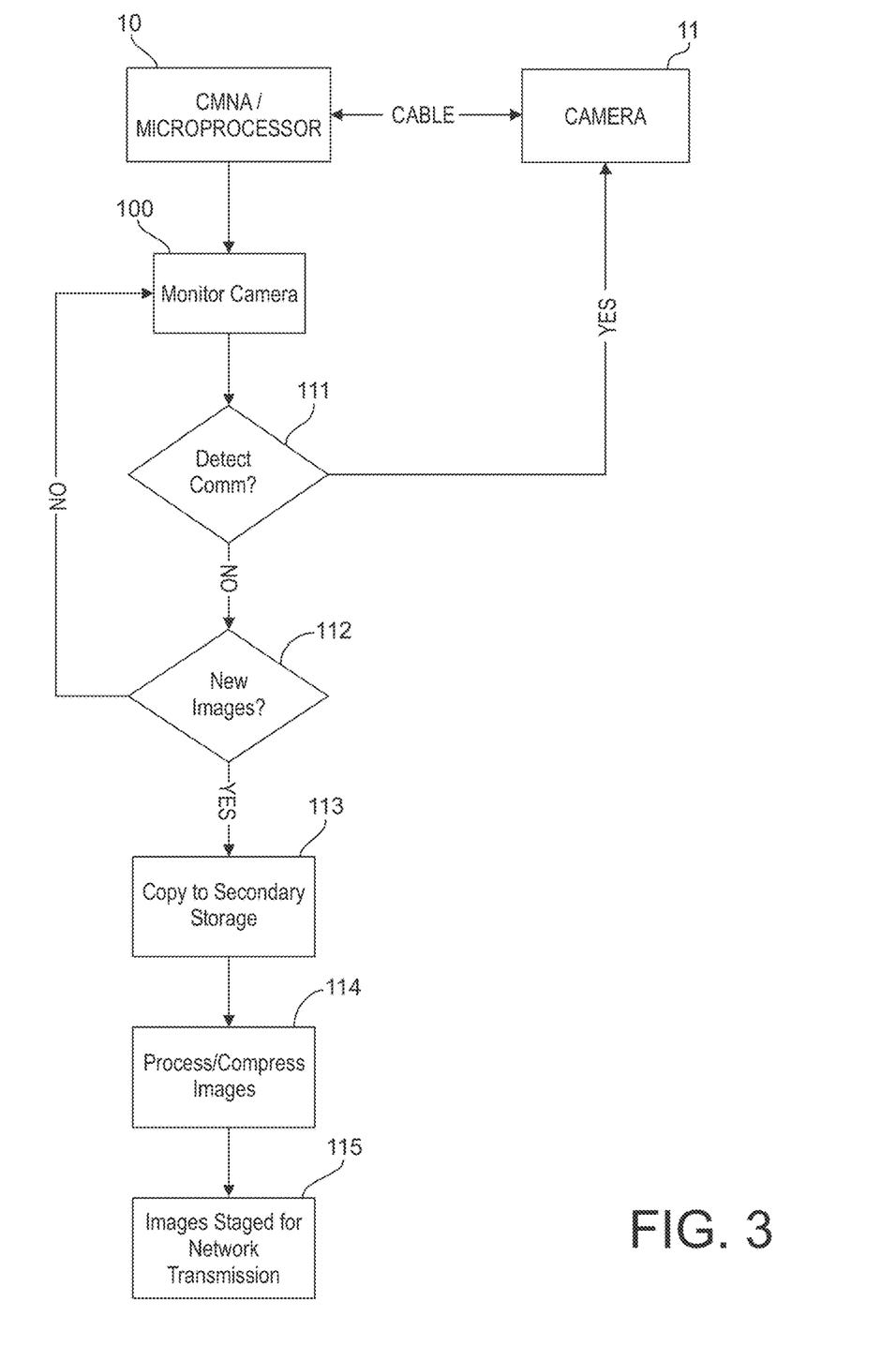
FIG. 3 is a flow diagram illustrating operation of the exemplary CMNA.

Referring to FIGS. 2 and 3, as previously described the exemplary CMNA 10 and digital trail camera 11 are operatively interconnected by first removing the existing memory card 60 from the trail camera 11, and then inserting the male connector 52 of flexible cable 30 into the vacated card slot 54 of the camera 11. The camera's memory card 60 is then inserted into the card slot 56 of CMNA housing 21 to interface with the microprocessor 22. The flexible cable 30 enables signal transmission along the traces 63 between the CMNA 10 and camera 11, thereby allowing "shared use" of the memory card 60. This card sharing can be accomplished using many different technologies, including both mechanical and solid state switching devices. The exemplary CMNA 10 uses four double pole, double throw relays. This allows the I/O lines on the memory card 60 to be transferred to and from the microprocessor 22 without interference from the camera 11, or vice versa. An additional solid state switch may be used to selectively control the power source for the memory card 60. This is provided to ensure that the I/O line switches have sufficient time to settle before activating the memory card 60.

As indicated at block 100 of FIG. 3, the CMNA microprocessor 22 actively monitors the trail camera 11, and determines when the camera 11 needs use of the memory card 60. This may be accomplished by monitoring the signals from the memory card port 54 of the camera 11. When the camera 11 requests the use of the memory card 60, signals are sent on the bus and these communications are detected by the CMNA 10. Referring to block 111, if a signal is detected, the CMNA 10 switches back control of the memory card 60 to the trail camera 11 in milliseconds, thereby allowing the camera 11 to write to the card 60. By doing this, the CMNA 10 is designed to be "transparent" to the camera 11 and should not interfere with the camera's standard operation, even if the CMNA 10 should lose power or fail.

If no signal is detected, or when the camera 10 has finished with the memory card 60, the microprocessor 22 switches back control of the memory card 60 to the CMNA 10 and determines if new images are available. See block 112 of FIG. 3. If new images are available, the CMNA 10 copies the images to the CMNA's integrated flash memory (e.g., memory card 23) for "secondary staging" at block 113. Before transmission of the images from the CMNA 10, the microprocessor 22 can perform additional processing at block 114, such as image compressing or resizing, thereby readying the images for quicker transfer over the network. See block 115.

During normal operation, the CMNA 10 remains in an idle or low power mode with no images to send to the network. In these periods, the CMNA 10 substantially shuts down to conserve battery power. The power supply is restored only when the trail camera 11 (or network) requires the CMNA 10 to "do work." When either the camera 11 or network is activated, it "wakes" the CMNA. Once the CMNA 10 is up, it remains active long enough to determine if it has work to do. If there is no present work, the CMNA 10 puts itself back to sleep. Otherwise, the CMNA 10 completes the work activity and then goes back to sleep. In this ultra-low idle mode, the CMNA 10 may require less than 35 micro watts of power.

Wireless Mesh Network (WMN)

Referring to FIGS. 2 and 4A, 4B, and 4C, as indicated above the exemplary CMNA 10 functions in cooperation with other like adapters in wireless mesh network (WMN) designed to communicate image data from one adapter to another within a coverage area (or "mesh cloud"), and ultimately routing to a network gateway device GW1, GW2, and GW3 and the remote computer "C". The gateway device may have functionality which can connect the network to the Internet. In the exemplary embodiment, one of the CMNAs 10 may have gateway functionality. If not connected to a trail camera, as previously described, a CMNA 10 operates as a "repeater" on the wireless mesh network, relaying images from one or more camera-attached CMNAs to the gateway device.

Network Transmission within the WMN

In an exemplary embodiment, computer software with suitable algorithms and other program instructions may be utilized to sleep cycle the wireless mesh network in a manner known and understood in the art. The CMNAs within the network use this sleep cycle to extend battery life. During sleep cycles, any images captured by a trail camera are transferred and stored in the CMNA's flash memory to be sent on the next wake cycle of the network.

Figures 4A, 4B:
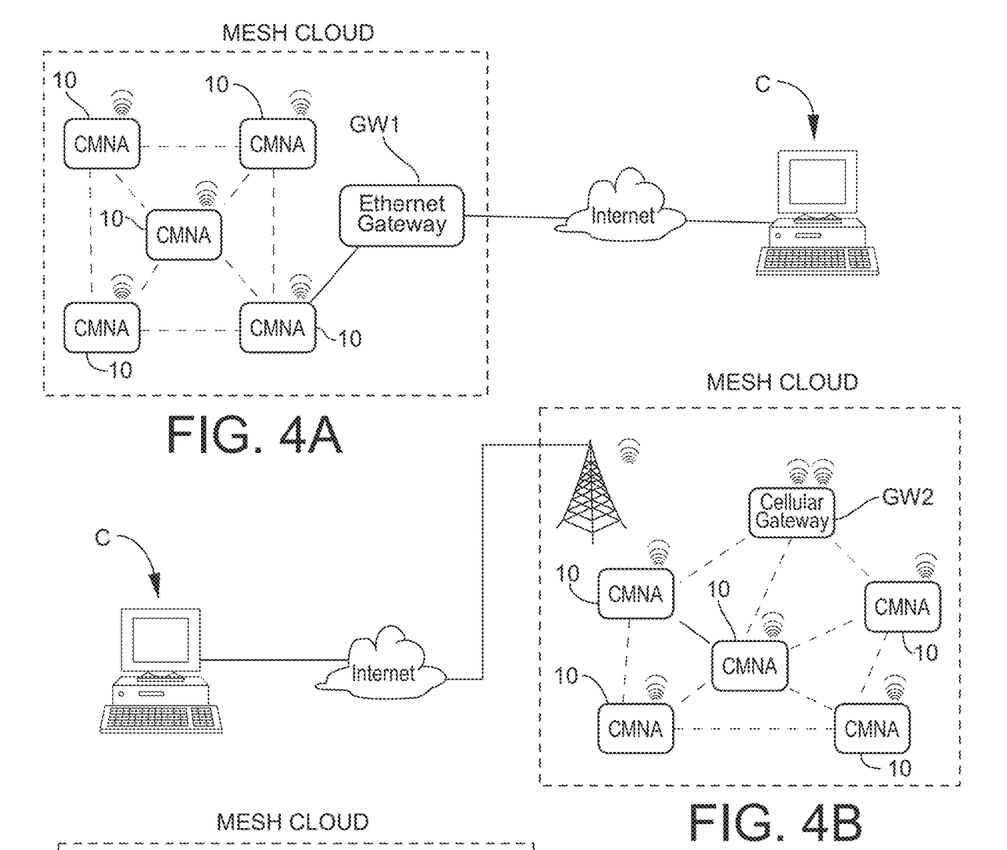
FIGS. 4A, 4B, and 4C illustrate multiple CMNAs functioning in various exemplary implementations of the present wireless mesh network.
Figure 4C:
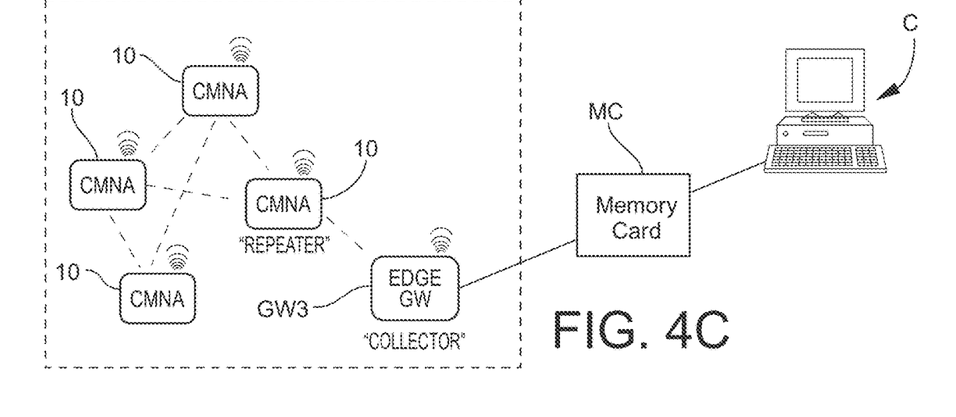
Figure 5:
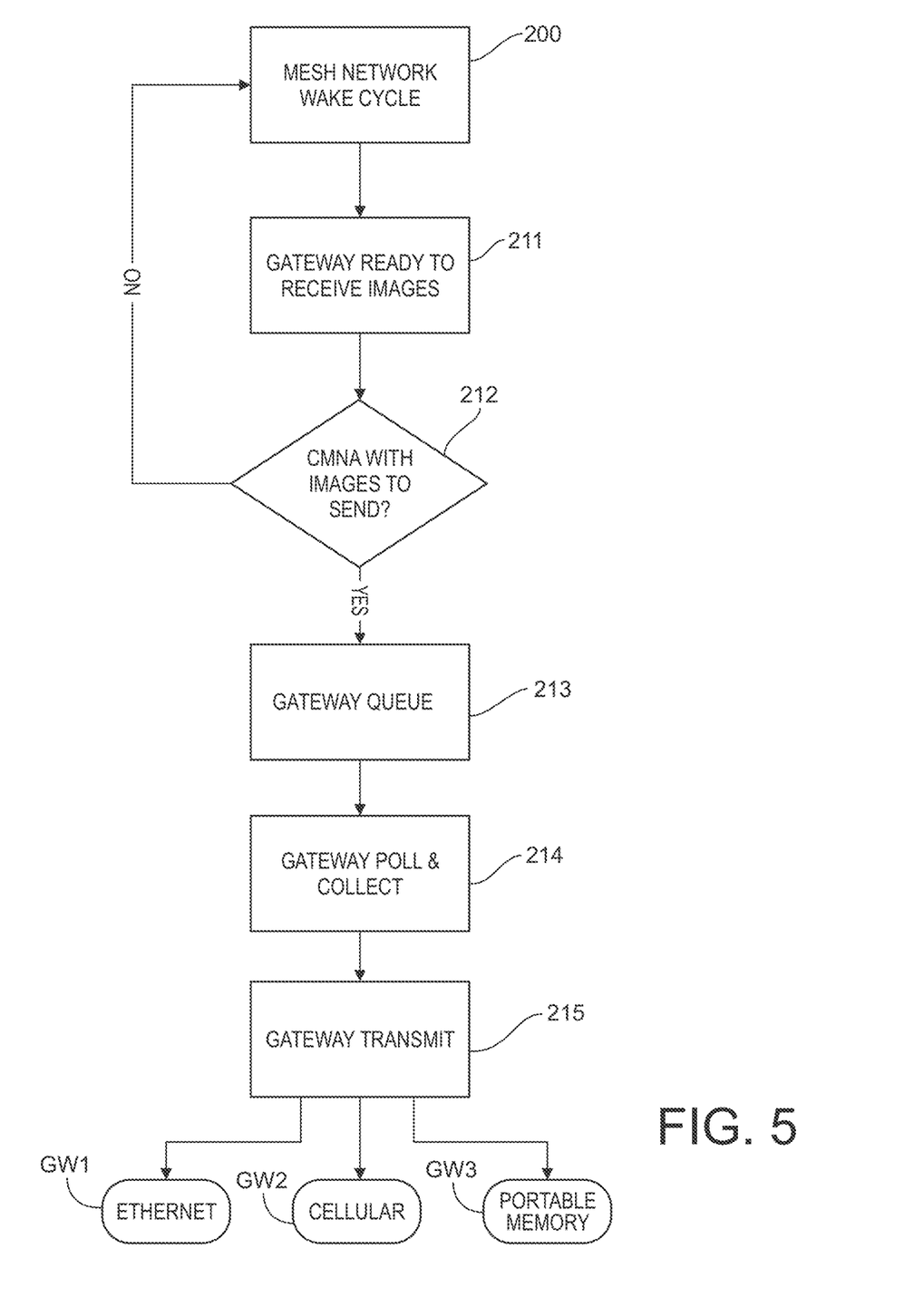
FIG. 5 is a further diagram illustration operation of the exemplary wireless mesh network.

Referring to FIGS. 4A, 4B, 4C, and 5, when the wireless mesh network wakes at block 200 in FIG. 5, the gateway device broadcasts to all CMNAs 10 that it is ready to receive images. See block 211. If a CMNA has images to be sent (block 212), it replies to the gateway device and is placed in a queue at block 213. The gateway device then polls each CMNA 10 at block 214 using Time Division Multiplexing (TDMA) to recover the new images. New images are collected from the CMNAs 10 one at a time—as the mesh network topology may not allow for multiple devices to send to a single recipient at the same time. TDMA is used to allow each CMNA 10 its "fair share" of the network functionality, ensuring that all CMNAs 10 have an equal opportunity to transfer images on a congested network.

As indicated at block 215, the exemplary wireless mesh network supports potential three gateway devices for users to recover images using a remote computer "C"; ethernet gateway (FIG. 4A), cellular gateway (FIG. 4B), and CMNA gateway or "collector" (FIG. 4C). The ethernet and cellular gateways—GW1 and GW2, respectively—deliver images to a "cloud" storage location—allowing the these images to be recovered via the internet using the remote computer "C". The CMNA collector (GW3) shown in FIG. 4C receives images from other CMNAs 10 on the network and stores these images on a removable flash memory card "MC". The CMNA collector (GW3) may be mounted in a conveniently accessed location, such that images can be easily retrieved and transferred to the remote computer "C".

Hardware Block Diagram

Figure 6:
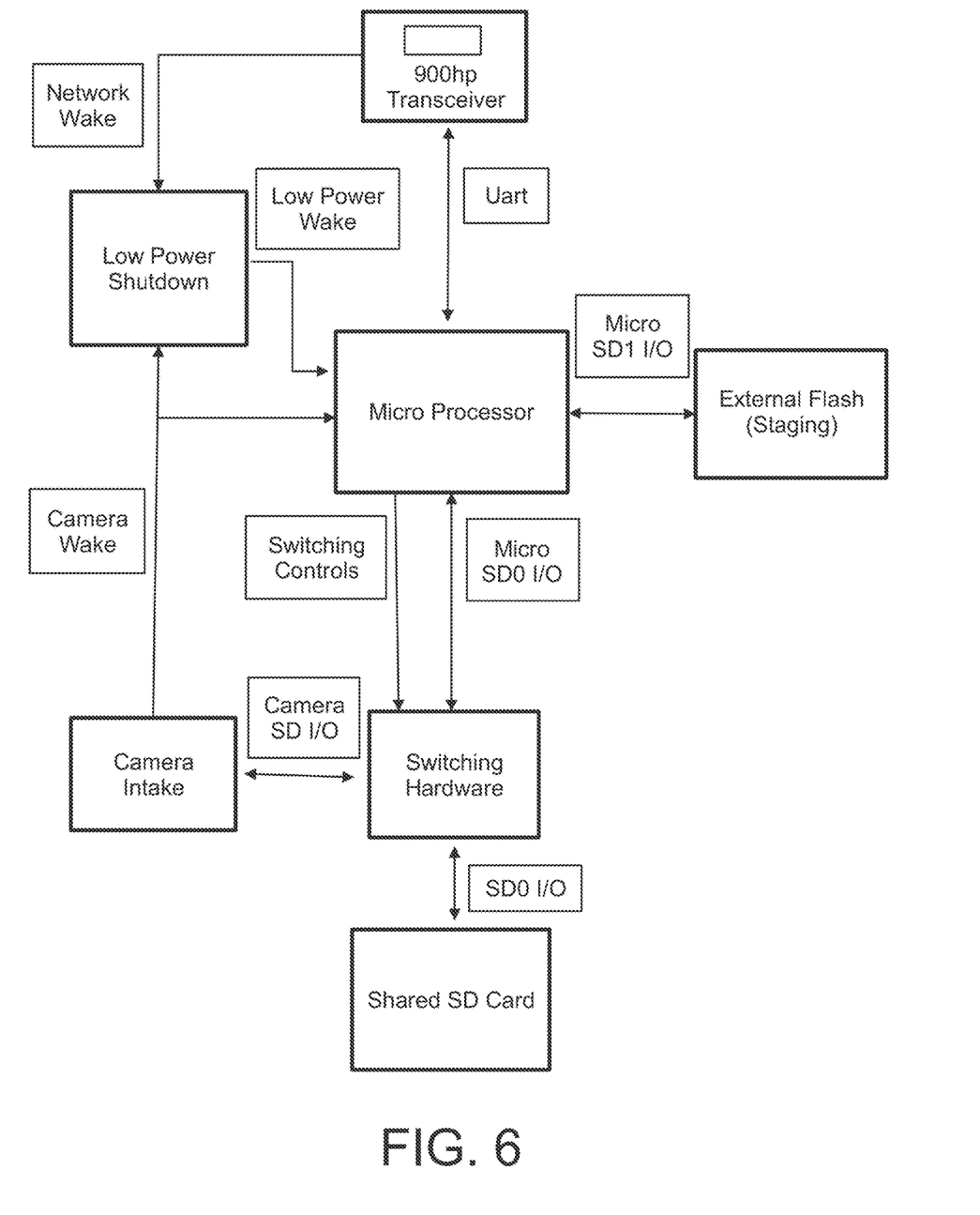
FIG. 6 is block diagram showing various hardware components of the exemplary CMNA.

FIG. 6 is a block diagram illustrating the interconnection of exemplary hardware components of the present CMNA. The microprocessor (uP) is central to the system, and uses computer program instructions and algorithms to manage the state of the CMNA. Each of the other blocks on the diagram represent external systems that are accessed or controlled by the micro processing unit. The exemplary transceiver is connected to the uP via a standard asynchronous serial port, and uses its own ultra-low power mode during its sleep cycles. The transceiver functions to wireless send and received image data over the present mesh network.

A low power shutdown circuit is used to put the CMNA into an ultra-low power state. When power is not needed by the uP, the low power circuit is signaled by the uP to shut down power to the CMNA processing hardware. The circuit then monitors the camera and mesh network for activity at which time it "wakes" the CMNA processing hardware.

The external flash memory, or staging memory, is a non-volatile memory location where data is stored until it can be transmitted across the mesh network. Depending on the type of the device, this storage could be accessed by the uP using many different communication techniques.

The camera interface connects the camera to the CMNA using the secure digital card slot on the camera via a male-to-male secure digital cable. The signals from the camera are routed through switching hardware that is controlled by the uP to multiplex the use of the shared SD memory. Additionally, the uP is monitoring the camera for activity to ensure the CMNA never interferes with normal camera operation.

The switching hardware is used for routing of data to and from the shared Secure Digital Card (SD card). This technology transfers SD digital I/O (input and output) lines between the uP and the camera. When the camera is not accessing the card, the uP checks to see if there are new images available to be sent. If so, it will copy those images to external flash. The uP then returns control of the SD card to the camera. If at any time the camera should need the shared SD card, control of the SD card is transitioned back to the camera without data loss or corruption. If the CMNA should fail or its batteries are depleted, the camera will continue operating normally.

The shared SD card supports four type of communication:
SPI bus mode (CMNA Prototype)
One-bit SD
Four-bit SD bus mode
Two differential lines SD UHS-II mode:
Potentially, any and all of these communication techniques can be supported.

Software State Diagram

Figure 7:
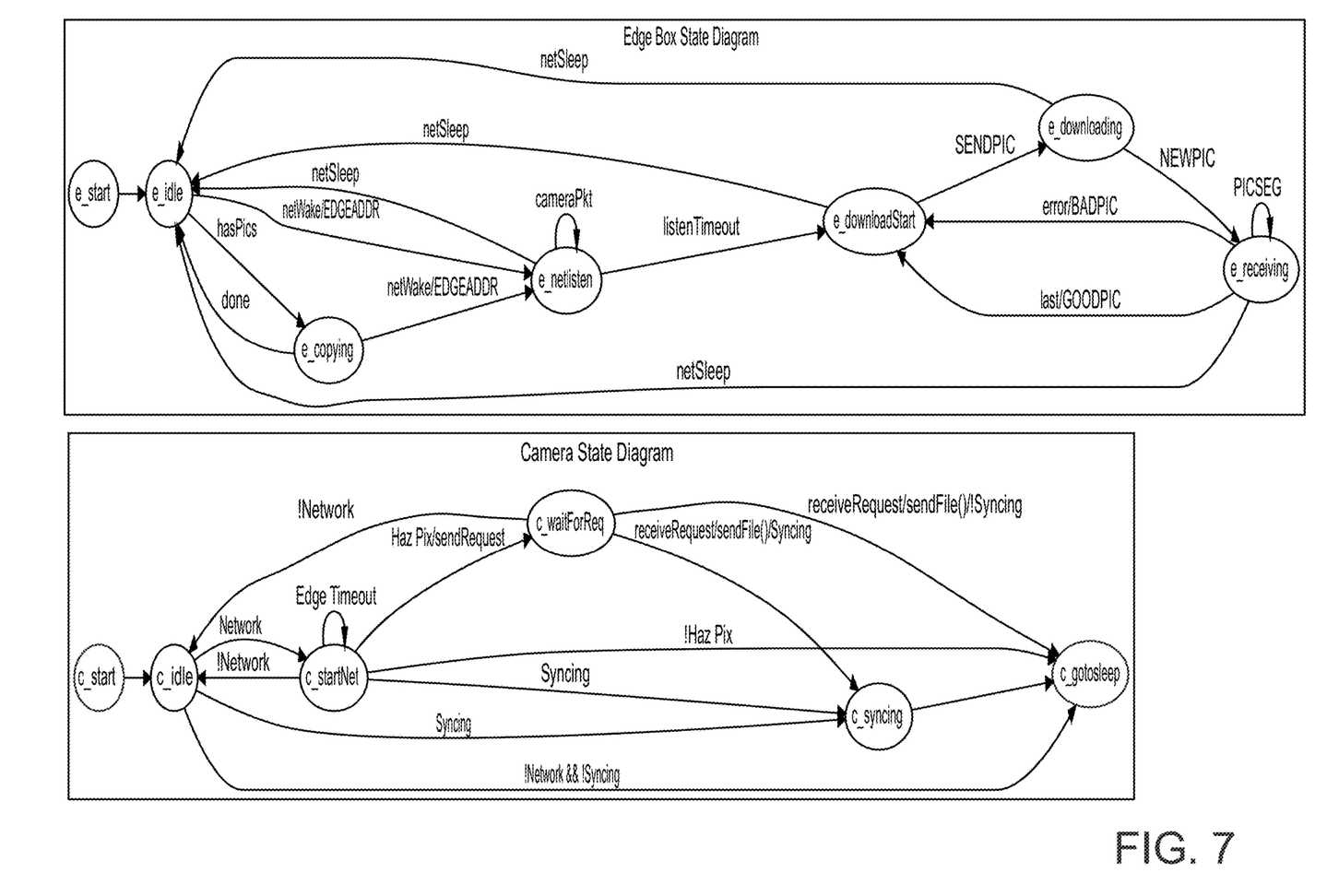
FIG. 7 is software state diagram for the exemplary CMNA.

Referring to FIG. 7, the software state diagram shows the various "states" of the software system, and how and when software transitions occur. Each oval represents a software state, while each arrow shows the next state. The text over each arrow represents the condition that causes the change in state. The two different diagrams represent the CMNA and Gateway (Edge Box or "collector") firmware. For example, if the CMNA is in the c_startNet state, and has pictures to send. The camera moves to the c_waitForReq state.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures, Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A mesh network adapter designed to communicate with a camera and configured to form a mesh node in a wireless mesh network, said network adapter comprising:
   a housing;
   a microprocessor located inside said housing;
   a non-volatile onboard data storage medium located inside said housing, and operatively connected to said microprocessor;
   a transceiver located inside said housing, and operatively connected to said microprocessor;
   a removable memory card adapted for inserting into a complementary card slot formed with said housing;
   an elongated flexible extension cable having an adapter end and camera end, said flexible cable operatively connecting to said microprocessor at the camera end, and interfacing with said onboard data storage medium and said removable memory card; and
   a rigid male connector formed with the camera end of said flexible cable, and having a plurality of exposed metal contacts adapted to mate with complementary contacts in a memory card slot of the camera, whereby said microprocessor functions to control the transfer of image data from the camera through said flexible cable to said removable memory card, and from said removable memory card to said onboard data storage medium for subsequent wireless transmission to a gateway within the mesh network.

2. The mesh network adapter according to claim 1, wherein said onboard data storage medium comprises a second removable memory card adapted for inserting into a second complementary card slot formed with said housing.

3. The mesh network adapter according to claim 1, wherein said flexible cable comprises a flat flexible cable comprising a plurality insulated electrical traces.

4. The mesh network adapter according to claim 1, wherein said removable memory card has a footprint configuration selected from a group consisting of standard size, mini size, and micro size.

5. The mesh network adapter according to claim 1, wherein the adapter end of said flexible cable is removably connected to said microprocessor.

6. The mesh network adapter according to claim 5, wherein the adapter end of said flexible cable comprises a rigid male connector having a plurality of exposed metal contacts adapted to mate with complementary contacts operatively connecting said flexible cable to said microprocessor.

7. The mesh network adapter according to claim 1, wherein said male connector at the camera end of said flexible cable has a footprint configuration substantially corresponding to a memory card footprint configuration selected from a group consisting of standard size, mini size, and micro size.

8. The mesh network adapter according to claim 1, wherein said removable memory card has a storage capacity of up to 2 TB.

9. The mesh network adapter according to claim 1, wherein said removable memory card has a bus speed of up to 624 Mbyte/s.

10. The mesh network adapter according to claim 1, wherein said removable memory card comprises a Secure Digital flash memory format.

11. A mesh network adapter designed to communicate with a camera and configured to form a mesh node in a wireless mesh network, said network adapter comprising:
    a housing;
    a microprocessor located inside said housing;
    a non-volatile onboard data storage medium located inside said housing, and operatively connected to said microprocessor;
    a transceiver located inside said housing, and operatively connected to said microprocessor;
    a removable memory card adapted for inserting into a complementary card slot formed with said housing;
    an elongated flexible extension cable having an adapter end and camera end, said flexible cable operatively connecting to said microprocessor at the adapter end, and interfacing with said onboard data storage medium and said removable memory card; and
    a rigid male connector formed with camera end of said flexible cable and having a footprint configuration corresponding to a footprint configuration of said removable memory card, and said male connector comprising a plurality of exposed metal contacts adapted to mate with complementary contacts in a memory card slot of the camera, whereby said microprocessor functions to control the transfer of image data from the camera through said flexible cable to said removable memory card, and from said removable memory card to said onboard data storage medium for subsequent wireless transmission to a gateway within the mesh network.

12. The mesh network adapter according to claim 11, wherein said onboard data storage medium comprises a second removable memory card adapted for inserting into a second complementary card slot formed with said housing.

13. The mesh network adapter according to claim 11, wherein said flexible cable comprises a flat flexible cable having a plurality insulated electrical traces.

14. The mesh network adapter according to claim 11, wherein said removable memory card has a footprint configuration selected from a group consisting of standard size, mini size, and micro size.

15. The mesh network adapter according to claim 11, wherein the adapter end of said flexible cable is removably connected to said microprocessor.

16. The mesh network adapter according to claim 15, wherein the adapter end of said flexible cable comprises a rigid male connector having a plurality of exposed metal contacts adapted to mate with complementary contacts operatively connecting said flexible cable to said microprocessor.

17. The mesh network adapter according to claim 11, wherein said removable memory card has a storage capacity of up to 2 TB.

18. The mesh network adapter according to claim 11, wherein said removable memory card has a bus speed of up to 624 MByte/s.

19. The mesh network adapter according to claim 11, wherein said removable memory card comprises a Secure Digital flash memory format.

* * * * *

UNITED STATES PATENT AND TRADEMARK OFFICE
CERTIFICATE OF CORRECTION

PATENT NO. : 10,757,271 B2
APPLICATION NO. : 16/096109
DATED : August 25, 2020
INVENTOR(S) : Gregory Herbert Gonzalez and Mark Earl Randall Page 1 of 1

It is certified that error appears in the above-identified patent and that said Letters Patent is hereby corrected as shown below:

In the Claims

In Claim 1, delete the word "camera" at Column 9, Line 41 and add the word --adapter--.

Signed and Sealed this
Eighth Day of June, 2021

Drew Hirshfeld
*Performing the Functions and Duties of the
Under Secretary of Commerce for Intellectual Property and
Director of the United States Patent and Trademark Office*